R. H. WAPPLER.
ENDOSCOPE.
APPLICATION FILED DEC. 27, 1909.

1,001,786.

Patented Aug. 29, 1911.

Witnesses
Chas. H. Smith
A. H. Serrell

Inventor
Reinhold H. Wappler
by Harold Serrell
his atty.

COLUMBIA PLANOGRAPH CO., WASHINGTON, D. C.

UNITED STATES PATENT OFFICE.

REINHOLD H. WAPPLER, OF NEW YORK, N. Y., ASSIGNOR TO AMERICAN CYSTOSCOPE MAKERS INC., OF NEW YORK, N. Y., A CORPORATION OF NEW YORK.

ENDOSCOPE.

1,001,786.  Specification of Letters Patent.  Patented Aug. 29, 1911.

Application filed December 27, 1909. Serial No. 534,987.

*To all whom it may concern:*

Be it known that I, REINHOLD H. WAPPLER, a citizen of the United States, residing in the borough of Manhattan, city, county, and State of New York, have invented an Improvement in Endoscopes, of which the following is a specification.

Heretofore endoscopes have been constructed with more or less shallow front lenses, whereby obviously a more or less limited field of vision is obtained and in which the image produced is more or less poorly lighted and none too well defined. With these endoscopes, in order to obtain a larger field of vision and to obtain a well lighted and well defined image, it would have been necessary to have employed a diaphragm or some similar device to restrict the rays of light, but obviously the use of such a device in an instrument of the class to which this invention relates, is impossible.

The object of this invention is therefore to provide an endoscope so constructed that a well defined and lighted image is obtained, a larger field of vision is also obtained and incidentally the construction is such that the image produced is a right-sided or rectified one.

Figure 1:
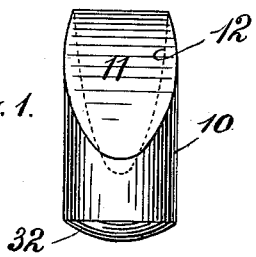
Figure 3:
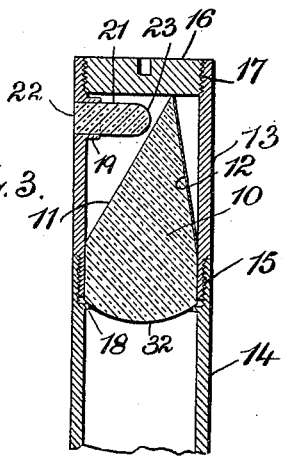
Figure 2:
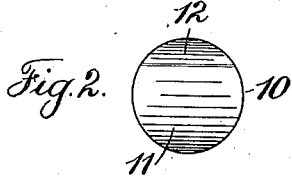
Figure 5:
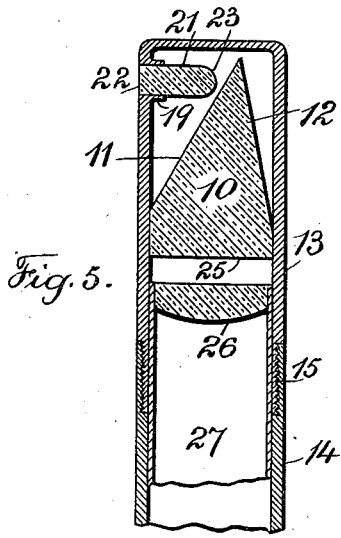
Figure 4:
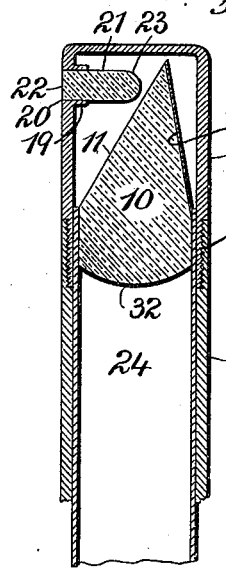
Figure 6:
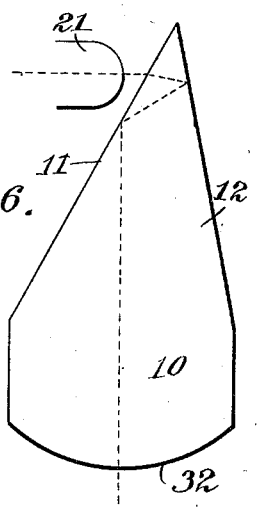

In the drawing, Figure 1 is an elevation of a lens employed in my improved endoscope. Fig. 2 is a plan view of the same. Fig. 3 is a central longitudinal section taken through the extremity of an endoscope made in accordance with my invention. Fig. 4 is a view similar to Fig. 3, showing a modified form of the invention, Fig. 5 is a view similar to Figs. 3 and 4, showing a further modification of the invention and Fig. 6 is a diagrammatic view illustrating the manner in which the rays of light are refracted and reflected in passing through the prismatic back lens employed in the instrument comprising my present invention.

Referring to the drawing and particularly to Figs. 1 and 2, in carrying out this invention I prefer to employ a refracting and reflecting prismatic back lens indicated at 10. This lens 10 is made of suitable material and the body portion thereof is preferably cylindrical. On this lens there is cut a face 11 preferably made at an angle of approximately 30° to the axis of the lens. Cut on this lens there is also a face indicated at 12, which is made at an angle of approximately 10° to the axis of the lens and as used and hereinafter described, the face 12 is covered with a coating of mercury or is otherwise so called silvered to produce a positive reflecting effect. Also as indicated in Fig. 1, the end of the lens 10, opposite the faces 11, 12, thereof, may be convex to obviate the use of a separate back lens in the instrument in which the same is employed.

Referring to Fig. 3, the hereinbefore described lens is placed in the tip or tubular removable end of an endoscope, the casing or tubular body of which is indicated at 14; the tip member 13 and the casing 14 are secured together by the screw threaded connection 15 or otherwise, as may be desired. At the extremity of the tip 13, a plug 16 is provided to close the end of the instrument, which is adapted to be fixed therein by engaging the interiorly provided screw threads 17 or otherwise. Interiorly the casing 14 may be provided with a rib 18, which when the tip 13 is in position in the casing 14, bears against the convex surface 32 of the lens at a point adjacent to its periphery in order to maintain the lens 10 in position in the instrument; the opposite end of the lens or that forming the line of intersection between the planes of the faces 11, 12, bearing against the inner face of the plug 16. It will also be apparent that the lens 10 may be otherwise and suitably secured in position in the instrument in any manner in which the same will be mounted concentrically with the tubular members of the instrument.

Adjacent to the end of the tip member 13, close to the plug 16, there is provided an internal flange indicated at 19, surrounding an opening 20 which extends not only through this flange 19, but also entirely through the walls of the tip member 13. Received within this opening or aperture 20 is a lens 21. This lens 21 is the front lens of the instrument and is preferably cylindrical in cross section and its length is materially greater than the diameter of its cross section. The lens is so set in the aperture 20 that its front outer face 22, which is preferably a plane face, is flush at its periphery with the outer surface of the tip member 13. The inner end of this lens 21 is convex and preferably hemispherical as indicated at 23, this end of the lens 21 lying adjacent to the surface 11 of the lens 10 at a point near the angular end of the lens 10, the surface 11 being at approximately 60° to the axis of the lens 21.

Referring to Fig. 4, it will be apparent that the end or extremity of the tip member 13 may be made integrally with this member, the tip member 13 being secured to the casing by the screw threaded connection 15 similar to that shown in Fig. 3. In this instance a sleeve 24, fitting the casing 14 and the tip member 13, may be employed and the lens 10 in this instance is secured in any desired manner in the end of the sleeve 24, which as will be understood is slidable longitudinally and is thus adjustable within the tip member 13 and with the lens 10 may be entirely removed therefrom for cleaning the instrument or other purposes. The structure and mounting of the front lens 21 in this modification of the invention is similar in all respects to that hereinbefore described in connection with Fig. 3. It will now be apparent that in the use of this instrument, the rays of light will enter by passing through the front lens 21, in which the same are more or less restricted, and will pass into the lens 10, be first refracted at the surface 11, then reflected by the surface 12 back to the surface 11 from which these rays will then be reflected through the portion of the lens acting as a back lens and indicated at 32.

By referring to Fig. 5, it will be apparent that the cylindrical end of the lens 10 may be provided with a plane surface indicated at 25 and that a separate back lens 26 may be employed in conjunction with the lens 10 and mounted in the sleeve 27 fitting within and removable from the casing 14 and the tip member 13, it being obvious in this construction that the lens 10 may be permanently mounted in the tip member 13 or removably mounted therein as hereinbefore described in connection with the other forms of the invention or otherwise.

As hereinbefore indicated, this endoscope through the form of the front lens 21, gives a relatively wide field of vision and concentrates the rays of light so that a well defined image is produced, and as will be understood, through the double reflecting effect of the lens 10, the image produced will be rectified without the employment of other lenses to accomplish this object.

By referring to Fig. 6, it will be seen that the rays of light in entering the lens 10 are refracted from the surface 11 to the surface 12, from which they are reflected back to the surface 11, where from the inclosed setting of the lens they are again reflected to the convex face 32 from which they pass out of the lens. For clearness I have shown only the central ray of light passing through the two lenses.

I claim as my invention:

1. In an endoscope the combination with a tubular body, of a cylindrical front lens and a prismatic back lens concentrically mounted in the tubular body and provided with oppositely disposed reflecting and refracting faces formed at different angles to the axis of the instrument and one of which faces is placed in a juxtaposed optical relation to the cylindrical lens for the transmission of the entering rays of light from the cylindrical lens into the endoscope.

2. In an endoscope the combination with a tubular body and tubular removable end, of a cylindrical front lens fixed near the free end of the said removable end transversely of said end with its axis upon a line radially to the axis of the tubular body, and a prismatic back lens in part cylindrical and having a face at approximately an angle of 30° to the axis of the tubular body and 60° to the axis of the cylindrical front lens and having a reflecting surface at an angle of about 10° to the axis of the said tubular body.

3. In an endoscope the combination with a tubular body and tubular removable end, of a cylindrical front lens fixed near the free end of the said removable end transversely of said end with its axis upon a line radially to the axis of the tubular body, and a back lens having a cylindrical part convex on one end and whose axis is coincident with that of the tubular body, and a prismatic or wedge shaped opposite end, one of whose faces is at approximately an angle of 60° to the axis of the cylindrical front lens and 30° to the axis of the tubular body and whose other and reflecting face is at an angle of about 10° to the axis of the tubular body.

4. In an endoscope the combination with a tubular body and tubular removable end, of a cylindrical front lens, the length of which is greater than the diameter and formed with an inner hemispherical end and fixed near the free end of the said tubular end transversely of said end with its axis upon a line radially to the axis of the tubular body, and a prismatic back lens concentrically mounted with reference to the tubular members.

5. In an endoscope the combination with a tubular body and tubular removable end, of a cylindrical front lens, the length of which is greater than the diameter and formed with an inner hemispherical end and fixed near the free end of the said tubular end transversely of said end with its axis upon a line radially to the axis of the tubular body, and a prismatic back lens in part cylindrical and having a face at approximately an angle of 30° to the axis of the tubular body and 60° to the axis of the cylindrical front lens and having a reflecting surface at an angle of about 10° to the axis of the said tubular body.

6. In an endoscope the combination with a tubular body and tubular removable end, of a cylindrical front lens, the length of which is greater than the diameter and formed with an inner hemispherical end and fixed near the free end of the said tubular end transversely of said end and with its axis upon a line radially to the axis of the said tubular body, and a back lens having a cylindrical part convex on one end and whose axis is coincident with that of the tubular body, and a prismatic or wedge shaped opposite end, one of whose faces is at approximately an angle of 60° to the axis of the cylindrical front lens and 30° to the axis of the tubular body and whose other and reflecting face is at an angle of about 10° to the axis of the tubular body.

7. In an endoscope, a tubular casing, a cylindrical front lens whose length is greater than its diameter and whose outer end is a plane surface and whose inner end is a convex surface fixed at the end of the instrument with its said outer end flush with the surface of the instrument, and a back lens associated therewith.

8. In an endoscope, a tubular casing, a cylindrical front lens whose length is greater than its diameter and whose outer end is a plane surface and whose inner end is a convex surface fixed at the end of the instrument with its said outer end flush with the surface of the instrument, and a double reflecting lens set in the instrument adjacent to the said cylindrical lens.

9. In an endoscope, a tubular casing, a cylindrical front lens whose length is greater than its diameter and whose outer end is a plane surface and whose inner end is a convex surface fixed at the end of the instrument with its said outer end flush with the surface of the instrument, and a lens having a convex surface and two plane surfaces fixed in the instrument adjacent to said cylindrical front lens.

10. In an endoscope, a tubular casing, a cylindrical front lens whose length is greater than its diameter and whose outer end is a plane surface and whose inner end is a convex surface fixed at the end of the instrument with its said outer end flush with the surface of the instrument, and a lens having a convex surface, a plane silvered surface at an angle of approximately ten degrees to the axis of the instrument and a plane surface at an angle of approximately thirty degrees to the axis of the instrument, the said lens being set in the instrument adjacent to the said cylindrical front lens.

11. In an endoscope the combination with a tubular body, of a cylindrical front lens set so that its axis is radial and at right angles to the axis of the said body, and a prismatic back lens concentrically mounted in the tubular body and provided with oppositely disposed reflecting and refracting faces formed at different angles to the axis of the instrument and one of which faces is placed in a juxtaposed optical relation to the cylindrical lens for the transmission of the entering rays of light from the cylindrical lens into the endoscope.

12. In an endoscope the combination with a tubular body, of a cylindrical front lens having a plane outer face approximately flat and a hemispherical inner end and set so that its axis is radial and at right angles with the axis of the said body, and a prismatic back lens concentrically mounted in the tubular body and provided with oppositely disposed reflecting and refracting faces formed at different angles to the axis of the instrument and one of which faces is placed in a juxtaposed optical relation to the cylindrical lens for the transmission of the entering rays of light from the cylindrical lens into the endoscope.

Signed by me this 15th day of December, 1909.

REINHOLD H. WAPPLER.

Witnesses:
 GEO. T. PINCKNEY,
 BERTHA M. ALLEN.

Copies of this patent may be obtained for five cents each, by addressing the "Commissioner of Patents, Washington, D. C."